Feb. 19, 1929.                                                    1,702,499
H. DALTON
SAW TABLE ATTACHMENT FOR LATHES
Filed Sept. 22, 1925        4 Sheets-Sheet 1

INVENTOR
Hubert Dalton
BY C. P. Goepel
his ATTORNEY

Feb. 19, 1929.

H. DALTON 1,702,499

SAW TABLE ATTACHMENT FOR LATHES

Filed Sept. 22, 1925    4 Sheets-Sheet 3

INVENTOR
Hubert Dalton
BY
his ATTORNEY

Feb. 19, 1929.   1,702,499
H. DALTON
SAW TABLE ATTACHMENT FOR LATHES
Filed Sept. 22, 1925    4 Sheets-Sheet 4
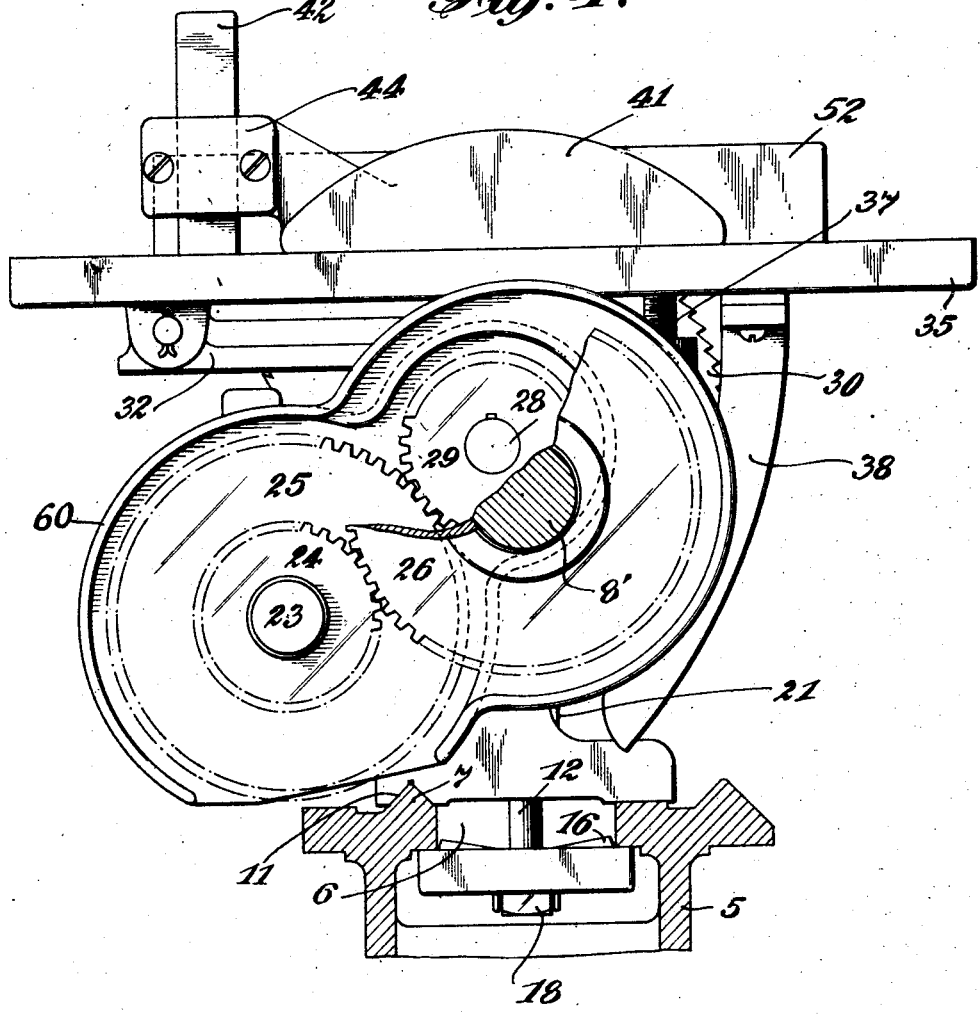
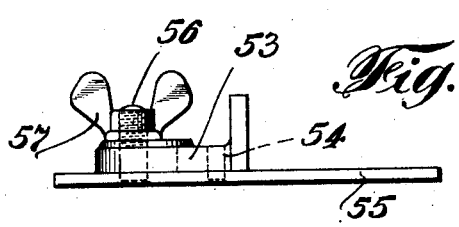
INVENTOR
Hubert Dalton
BY
his ATTORNEY Patented Feb. 19, 1929.

1,702,499

UNITED STATES PATENT OFFICE.

HUBERT DALTON, OF STAMFORD, CONNECTICUT.

SAW-TABLE ATTACHMENT FOR LATHES.

Application filed September 22, 1925. Serial No. 57,818.

This invention relates to an improved saw table attachment for lathes, and has for its primary object to provide a simply constructed and serviceable saw table which may be easily and quickly attached to the bed of an ordinary lathe and the saw mandrel or shaft operatively connected with the head stock spindle of the lathe.

It is another object of the present improvements to provide a pivotally mounted or supported table which may be easily and quickly adjusted as desired relative to the saw blade or swung to an inoperative position substantially completely exposing the blade, and said table carrying guard means adapted to afford complete protection to the mechanic during the operation of the saw.

It is a further object of the invention to provide a guard for the upper edge portion of the saw projecting above the surface of the table and means for easily adjusting said guard relative to the table surface and securely fixing the same in adjusted position whereby the work may be engaged by the cutting edge of the saw blade.

It is also an additional object of the invention to provide the table with independent means for detachably mounting work guiding devices thereon.

With the above and other objects in view, the invention consists in the improved saw table attachment for lathes, and in the form, construction and relative arrangement of its several parts as will be hereinafter more fully described, illustrated in the accompanying drawings and subsequently incorporated in the subjoined claim.

In the drawings, wherein I have illustrated one simple and practical embodiment of the invention and in which similar reference characters designate corresponding parts throughout the several views,—

Fig. 4 is a similar section taken on the line 4—4 of Fig. 1;

Fig. 6 is a side elevation thereof.

Figure 1:
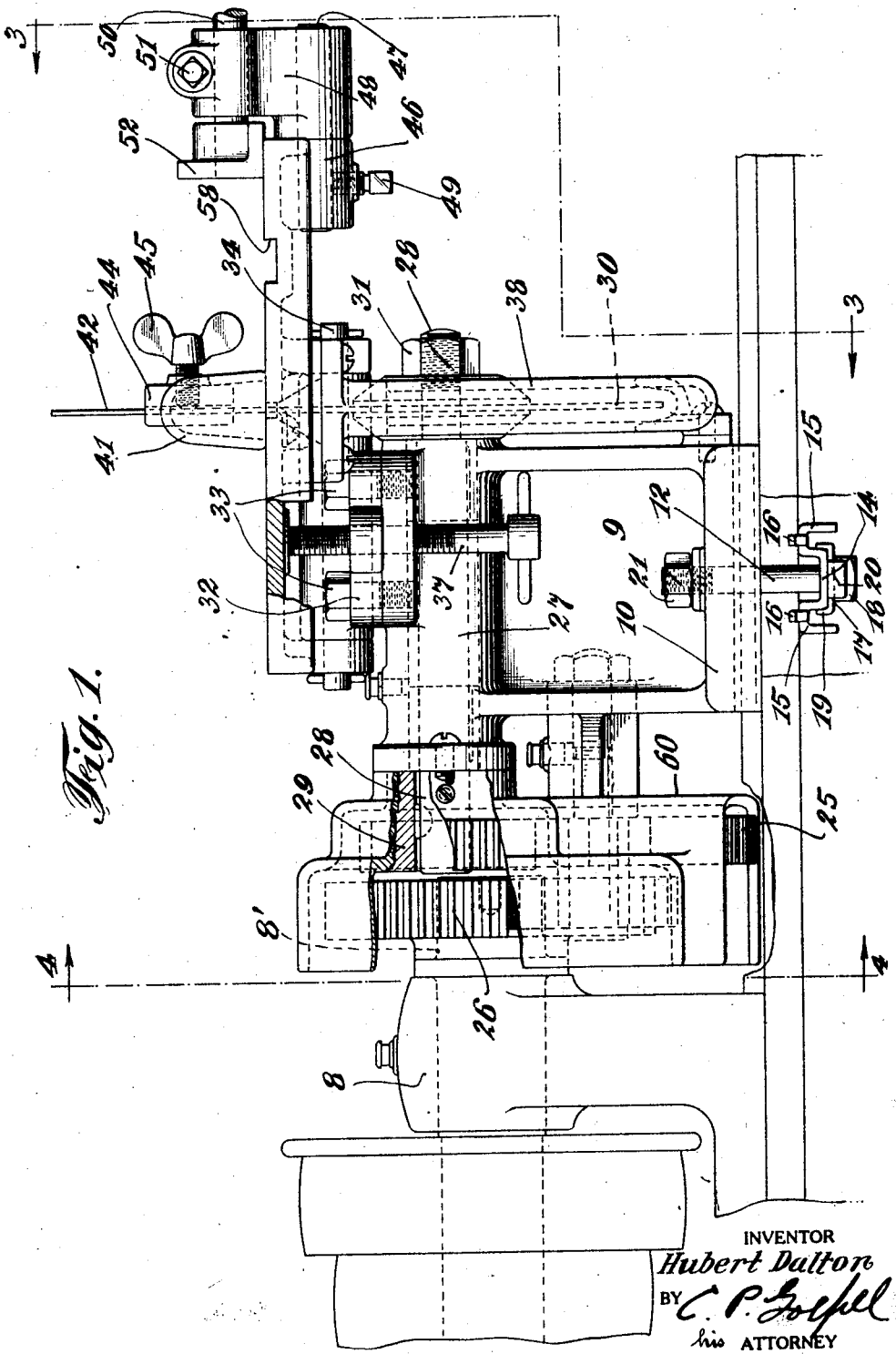
Figure 1 is a side elevation showing my improved saw table attachment in operative position upon the lathe and certain of its parts being illustrated in section.
Figure 2:
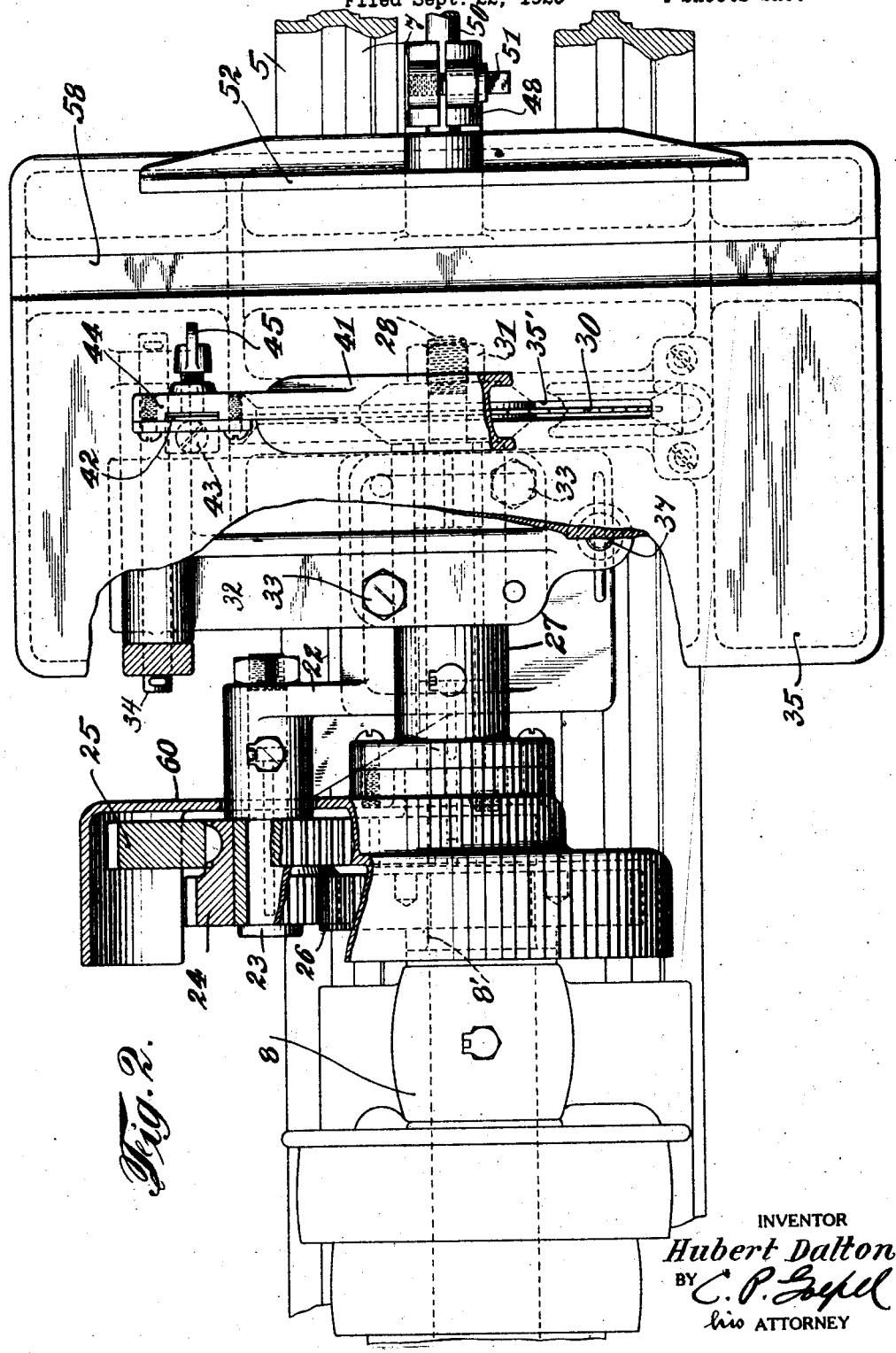
Fig. 2 is a top plan view partly in section.
Figure 3:
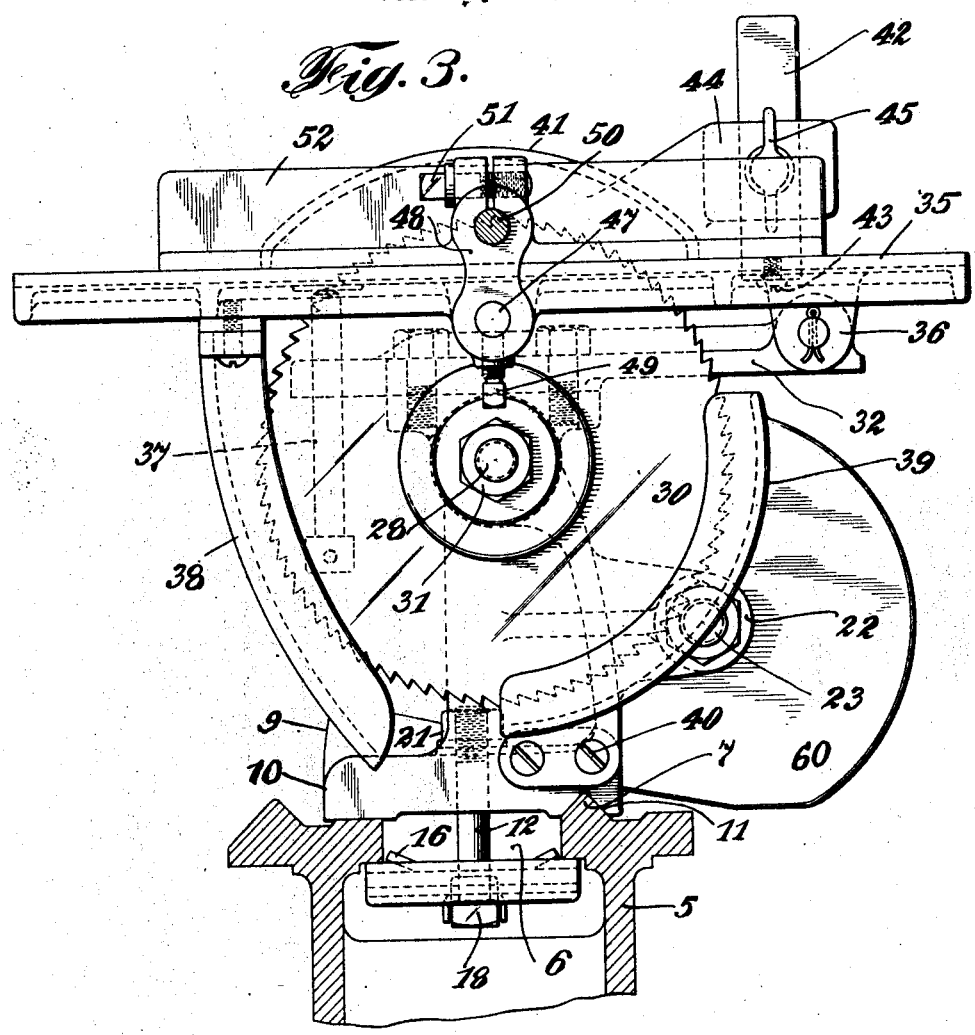
Fig. 3 is a transverse sectional view taken on the line 3—3 of Fig. 1.

The invention forming the subject matter of the present application is applicable to various types of lathes now in general use, and therefore, in the drawings I have illustrated only so much of the lathe as is required to disclose the manner of application and operative connection of my present improvements thereto. To this end, the conventional lathe bed 5 has the usual spaced parts upon which the lathe carriage and work rests are adapted to be mounted and which provides a central longitudinally extending slot or opening 6. Upon the upper surface of the lathe bed at one side of the slot 6 a longitudinally extending V-shaped rib 7 is formed and provides means for properly locating the head stock 8 of the lathe in proper alignment upon the bed 5.

The attachment forming the subject matter of the present application includes a standard or pedestal 9 having a horizontally extending base 10 at its lower end adapted to be seated upon the lathe bed, said base 10 being provided in its bottom face with a groove or channel 11 to receive the rib 7. A vertical bolt 12 is adapted to be positioned through an opening in the base 10 and extends downwardly through the slot 6 in the lathe bed and through an elongated opening provided in a clamping plate 14. This clamping plate, as shown in Fig. 1 of the drawings has spaced longitudinally extending portions 15 which are adapted for bearing engagement at their opposite ends against the under side of the lathe bed at the opposite sides of the slot 6. These portions of the clamping plate are formed with upwardly projected tongues 16 opposed to the opposite side walls of the slot 6 in the lathe bed and providing stops preventing longitudinal shifting movement of the plate relative to the bolt 12. A locking washer 17 is engaged on the lower end of the bolt between the bolt head 18 and the central portion of the plate 14, said washer having upwardly extending lugs 19 located at opposite sides of the central part of the plate 14 and being also provided with the downwardly extending lugs 20 for engagement upon opposite side faces of the bolt head 18. Thus, it will be understood that the bolt 12 is securely held or locked against turning movement when the nut 21 is threaded upon the upper end thereof. This nut may be conveniently tightened by means of a wrench whereby the base 10 of the standard or pedestal is securely clamped or rigidly fixed in its adjusted position upon the lathe bed.

The standard 9 at one side thereof, is formed with a transversely extending arm 22 in which a stud shaft 23 is rigidly fixed. On this stud shaft the gears 24 and 25 keyed together or otherwise connected for rotation as a unit, are loosely mounted. The gear 24 is in meshing engagement with a driving gear 26 threaded or otherwise detachably secured upon the end of the head stock spindle 8'.

The standard 9 at its upper end is provided or formed with a suitable bearing 27 to receive the saw mandrel or shaft 28. On one end of this shaft extending beyond the bearing 27 the gear 29 is keyed or otherwise fixed and is in constant meshing engagement with the gear 25. On the opposite end of said mandrel 28 between spaced discs or flanges the circular saw blade 30 is rigidly clamped or fixed by means of a nut 31 threaded upon a reduced end of the mandrel.

A horizontally disposed bracket 32 is rigidly fixed at one of its ends upon the upper side of the bearing 27 as by means of the screws 33 and in the other end of this bracket a rod or pin 34 is engaged, the ends of said pin extending through apertured lugs 36 on the under side of the saw table 35, said pin thus supporting the table for pivotal or swinging movement. In the fixed end of the bracket 32 a vertically disposed adjusting screw 37 is threaded and at its upper end bears against the under side of the table 35. It will thus be understood that by the manipulation of this screw the table may be caused to swing upon the pivot rod or pin 34 to position the upper surface of said table in the desired plane.

For the purpose of guarding the mechanic or workman against possible injury by the toothed edge of the saw blade, I provide a curved depending channel shaped guard member 38 fixed to the under side of the table and receiving the forward edge portion of the saw blade. A second curved guard member 39 is fixed to the base of the standard or pedestal 9 at one of its ends as at 40 and receives the rear edge portion of the saw blade. It will be noted that the guard member 38 is of such curvature that the free upward swinging movement of the table upon its pivot 34 is permitted without contact of the guard member with the toothed edge of the saw.

In addition to the guards 38 and 39, I provide a third guard member 41 for the cutting edge of the blade which extends above the surface of the table through the saw blade receiving slot 35' therein. When the attachment is not being used, this latter guard member may rest upon the surface of the table and completely enclose or house the upper portion of the saw blade. However, in order to permit the work to be engaged with the cutting edge of the saw, the guard member is adjustably supported upon the table, and to this end, in one embodiment of the invention, I provide a vertically positioned guide 42 having its lower end extended through an opening or slot in the table 35 and fixed to the under side thereof by a screw 43. The guard member 41 is provided with an arm or extension 44 slidably engaged upon the guide 42 and carrying a suitable clamping or set screw 45 adapted for engagement with the fixed guide 42. It will thus be understood that by adjusting this guard member 41 vertically upon the guide 42, the lower edge of said guard member may be spaced above and in parallel relation to the surface of the saw table so as to permit movement of the work piece beneath the guard into engagement with the cutting edge of the saw blade.

The vertically positioned guide 42 spaced from one end of the saw receiving slot in the table and in line therewith is adapted to enter the saw-kerf in the work to prevent closing thereof and thus obviate binding of the work against the opposite sides of the saw blade.

Upon the under side of the table 35 at one side edge thereof, an apertured lug 46 is formed to detachably receive a rod 47 fixed in a bracket member 48, said rod being securely held in fixed relation to the lug 46 by means of a suitable set screw 49. The bracket 48 is vertically disposed and at its upper end is provided with an opening and is preferably split for clamping engagement on a rod 50, said rod being securely fixed in adjusted position by means of the clamping screw 51. One end of this rod is provided with an elongated work guide 52 of angular form in cross section adapted to rest upon the upper surface of the table 35. This work rest is used for making rip cuts, and by merely loosening the screw 51 may be readily adjusted towards or from the saw blade in accordance with the width of the work piece.

Figure 5:
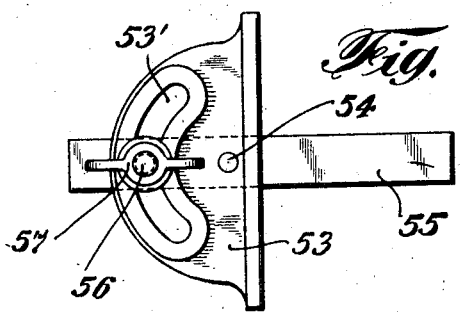
Fig. 5 is a plan view of one of the detachable work guiding devices.

For cross cutting or miter cutting operations, the work guide illustrated in detail in Fig. 5 of the drawings is used. This guide consists of an angularly flanged plate 53, which is pivotally secured by means of a pivot pin or rivet 54 upon a spline 55. The horizontal flange of the plate 53 is provided with a slot 53' therein in concentric relation to the pivot 54 which receives an upstanding screw 56 fixed in the spline 55 and upon which a suitable clamping nut 57 is threaded. By loosening this nut, the plate 53 may be properly adjusted to dispose its vertical flange in any desired angular position relative to the spline 55, and the plate then rigidly fixed in such position by tightening the nut 57. The spline 54 is adapted to be engaged in a groove or channel 58 formed in the upper surface of the table 35. Either of these work guides 52 or 53 may be very easily and quickly mounted in operative position upon the saw table or removed therefrom and greatly adds to the utility of the attachment.

Preferably, the drive gearing is completely enclosed within a suitably shaped housing 60.

From the foregoing description considered in connection with the accompanying drawings, the construction, manner of use and several advantages of my present invention will be readily understood. It will be seen that I have provided a saw table attachment which is easily and quickly applicable to various standard makes of lathes and can be readily adjusted on the lathe bed and operatively connected with the head stock spindle to drive the saw carrying mandrel or shaft. The device as herein described, is equally serviceable for the operation of all types of circular wood saws and also for metal cutting saws. The mounting and arrangement of the several elements of the drive gearing as above referred to is merely suggestive, and it will be readily apparent that various other driving connections between the head stock spindle and the saw mandrel might be substituted therefor. Likewise, similar mechanical changes might be resorted to in the form and construction of the saw table and its supporting pedestal or standard as well as in the several other detail parts of the attachment. It is accordingly to be understood that while I have found the construction herein referred to as entirely satisfactory in practical use, the essential features of my present improvements may be incorporated in various other alternative structures, and the privilege is therefore, reserved of resorting to all such legitimate changes therein as may be fairly embodied within the spirit and scope of the invention as claimed.

I claim:

An attachment for lathes comprising a standard, a bearing supported by the standard, said standard being adapted to be mounted upon a lathe bed, a transverse arm supported by the standard, a stud joined to said arm, gears on said stud connected rigidly together, one of said gears on said stud shaft being so arranged that it may be engaged with a gear up on the headstock mandrel of the lathe, a shaft in the bearing having a gear to mesh with the other gear on the stud shaft, a saw on the shaft in the bearing, a horizontally-disposed bracket rigidly secured to the top of the bearing and projecting to both sides of the bearing, a table pivotally attached to one end of said bracket, and an adjustable screw mounted adjacent the other end of the bracket to engage the under side of the table and regulate the position thereof, the work table having a slot to receive the saw.

In testimony that I claim the foregoing as my invention, I have signed my name hereto.

HUBERT DALTON.